United States Patent [19]
Glebovsky et al.

[11] Patent Number: 5,520,800
[45] Date of Patent: May 28, 1996

[54] DEVICE TO PROVIDE A TRIBOCHEMICAL MODE OF OPERATION IN A LUBRICATION SYSTEM FOR A MECHANISM

[75] Inventors: Dmitry N. Glebovsky; Mikhail E. Judovich, both of Sankt-Peterburg; Vladimir G. Povarov, Luga; Nikolai N. Shenberg, Sankt-Peterburg, all of Russian Federation

[73] Assignee: Zakrytoye Aktsionernoye Obshchestvo "Troiler-Korporatsiya", U.S.S.R.

[21] Appl. No.: 295,647

[22] PCT Filed: Aug. 9, 1993

[86] PCT No.: PCT/RU93/00190

§ 371 Date: Sep. 24, 1994

§ 102(e) Date: Sep. 24, 1994

[87] PCT Pub. No.: WO94/15077

PCT Pub. Date: Jul. 7, 1994

[30] Foreign Application Priority Data

Dec. 28, 1992 [SU] U.S.S.R. .................. 92016067

[51] Int. Cl.⁶ .................. B01D 29/60; B01D 29/07
[52] U.S. Cl. .................. 210/130; 123/196 A; 184/6.24; 210/168; 210/205; 210/296; 210/443; 210/493.1
[58] Field of Search .................. 210/130, 136, 210/168, 171, 205, 295, 493.1, DIG. 13, DIG. 17, 223, 443, 444, 296; 184/6.24; 123/196 A, 196 R

[56] References Cited

U.S. PATENT DOCUMENTS

| | | | |
|---|---|---|---|
| 2,093,430 | 8/1936 | Franklin et al. | 184/6.24 |
| 2,262,526 | 11/1941 | Fairlie et al. | 123/196 A |
| 2,262,527 | 11/1941 | Fairlie et al. | 123/196 A |
| 2,262,528 | 11/1941 | Fairlie et al. | 123/196 A |
| 2,262,529 | 11/1941 | Fairlie et al. | 184/6.24 |
| 3,005,555 | 10/1961 | Bosworth . | |
| 3,279,607 | 10/1966 | Michaelson | 210/493.1 |
| 3,558,478 | 1/1971 | Geyer et al. | 184/6.24 |
| 3,749,247 | 7/1973 | Rohde | 210/205 |
| 4,751,901 | 6/1988 | Moor | 123/196 A |
| 5,374,354 | 12/1994 | Baehler et al. | 210/168 |

FOREIGN PATENT DOCUMENTS

| | | |
|---|---|---|
| 208377 | 2/1968 | U.S.S.R. . |
| 1343045 | 10/1987 | U.S.S.R. . |
| 1507995 | 9/1989 | U.S.S.R. . |
| 982466 | 2/1965 | United Kingdom ........ 210/DIG. 17 |
| 1541051 | 2/1979 | United Kingdom . |
| WO94/15077 | 7/1994 | WIPO . |

*Primary Examiner*—Joseph W. Drodge
*Attorney, Agent, or Firm*—Beveridge, DeGrandi, Weilacher & Young

[57] ABSTRACT

A device to provide a tribochemical mode of operation in a lubrication system for a mechanism comprises a casing (1), a cover (2) with holes (3 and 4) for oil inlet and outlet, respectively, a non-return valve (5), a relief valve (6), a full-flow filtering element (7), and an alkaline reagent and iodine provided in succession along the oil flow. The alkaline reagent is coated over metal rods (8) installed outside and round the perimeter of the filtering element (7) while the iodine is provided in the interior (9) thereof. The rods (8) are made of aluminium and have a height corresponding to that of the filtering element (7). A textile or gauze covering (10) is placed over the filtering element (7) complete with the rods (8).

9 Claims, 2 Drawing Sheets

DEVICE TO PROVIDE A TRIBOCHEMICAL MODE OF OPERATION IN A LUBRICATION SYSTEM FOR A MECHANISM

FIELD OF THE INVENTION

The present invention is in the field of machine building, relating more specifically to circulating systems of lubrication for use with mechanisms and engines, more particularly internal combustion engines.

PRIOR ART

Devices have been developed to enable stabilization of oil properties and extension of the useful life of pairs of surfaces in friction in mechanisms, wherein a prolonged effect alkaline reagent and iodine are used to provide a special tribochemical mode of operation. The provision of such a mode in a lubrication system used with a mechanism may extend the usefulness of motor oil 3 to 8 times while also extending the service life of a mechanism between repairs 1.5 to 3 times. Devices of this type have been realized in practice and are utilized by preference in diesel engines of various designations, which have an external oil supply line. Using the technology under discussion in carburetor engines is problematic in that an appropriate device is to be developed that would not require the lubrication system to be modified.

There is known a device providing a tribochemical mode of operation in a lubrication system usable with a mechanism (SU, A1, No. 1 343 045) which comprises a casing, a cover with inlet holes and an outlet nozzle for oil inflow and outflow, a relief valve, a tribochemical package, and an indicator to show the extent of fouling within the device. The tribochemical package consists of two covers, with three cylindrical shells, perforated for oil passage, installed therebetween. The smaller- and middle-diameter shells are enveloped in filtering material. Granulated alkaline reagent is placed in between the larger- and middle-diameter shells. The filtering material of the smaller-diameter shell is impregnated with iodine. The fouling indicator is linked mechanically with the relief valve to show when this is opened.

With the device in operation, the oil from the peripheral zone of the casing passes through the perforations of the larger-diameter shell on to the alkaline reagent to partially dissolve it. As a result, some of the oil properties are improved and stabilized. Further on, the oil arrives at the filtering material of the middle-diameter shell, where it is cleaned of mechanical impurities, including fine alkaline-reagent particles. Next, the oil feeds on to the filtering material of the smaller-diameter shell to contact the iodine contained therein. This results in further improvement of the oil properties and in the formation of friction modifiers.

Thus, this prior-art device assures the provision of a tribochemical mode of operation in the lubrication system of a running mechanism and is capable of maintaining it for a long time, based on the amount of chemical reagents contained therein. However, the surface area of the filtering material of the shell is too small in this device, and this leads to the device being fouled after a short time and to increasing resistance to the oil flow. The result is that the relief valve will open and uncleaned oil will flow into the mechanism directly, by-passing the tribochemical package, which calls, in its turn, for continually watching the fouling indicator. In summing up, the device has a short continuous-service life and requires frequent cleanings.

An improved version is a device to provide a tribochemical mode of operation in a lubrication system usable with a mechanism (SU, A1, 1 507 995), comprising a casing, a cover with inlet holes and an outlet nozzle for oil inflow and outflow, a relief valve, a tribochemical package, and an indicator to show the extent of fouling within the device. The tribochemical package consists of two covers, with three cylindrical shells, perforated for oil passage, installed therebetween. The small- and middle-diameter shells are enveloped in filtering material. Granulated alkaline reagent is placed in between the larger- and middle-diameter shells. The filtering material of the smaller-diameter shell is impregnated with iodine. The fouling indicator is linked mechanically with the relief valve to show when this is opened. Apart from the aforesaid elements, the device contains a full-flow filtering element mounted on the larger-diameter shell.

The operation of this device is essentially as described for the device discussed previously. The only difference is that the oil from the peripheral zone of the casing first feeds on to the filtering element and when it comes to the tribochemical package it is already free of mechanical impurities.

This device eliminates, in part, the disadvantages described here in before. However it is specific in that the tribochemical package takes up a large part of the space within the casing so that little space is left for accommodation of the filtering element. For this reason, it has a small filtering surface area, hence a low dirt absorbance capacity—considerably lower as compared to standard oil filtering elements. Thus, monitoring the extent of fouling with the aid of an indicator remains a requirement in the operation of this device too. The continuous-service lives of the tribochemical package and the filtering element are vastly different. Standard filtering elements being unsuitable for use in the device makes its manufacture a rather involved process. To sum it up, the device has a complicated design and requires an involved manufacturing process while being demanding in operation.

DISCLOSURE OF THE INVENTION

The invention is based upon the objective of providing a design for a device to provide a tribochemical mode of operation in a lubricating system usable with a mechanism, wherein an alkaline reagent and iodine would be provided in a manner such that the device could be based on any mass-produced full-flow oil filter to simplify the design of the device, as well as facilitate its manufacture and operation.

The objective as stated above is achieved by providing a device to provide a tribochemical mode of operation in a lubrication system for a mechanism, comprising a casing, a cover with oil inlet and outlet holes, a non-return valve, a relief valve, a full-flow filtering element, an alkaline reagent and iodine provided in succession along the oil flow, wherein, in accordance with invention, the alkaline reagent is coated over metal rods installed outside and round the perimeter of the filtering element while the iodine is provided inside, in its interior.

This manner of arrangement of alkaline reagent and iodine poses no special requirements for the design of the casing, cover, filtering element, non-return valve, and relief valve, making it possible to realize the device, using for its base any known full-flow oil filter without having to modify the design of filter components. This enables a simpler design and an easier operation for the device while facilitating the manufacturing process.

It is convenient for the rods to be coated with alkaline reagent to be made of aluminium.

The use of aluminium for the purpose assures good adhesion between reagent and metal and an adequate mechanical strength for the coated rod. Besides, aluminium serves as an additional source for the formation of friction modifiers.

It is likewise convenient for the height of the alkaline reagent-coated rods to correspond with that of the filtering element.

This arrangement favors easier installation and assures reliable retention of the rods in the corrugations of the filtering element.

Besides, it is convenient that a protective covering be placed over the filtering element complete with the rods.

The use of a protective covering will completely preclude the ingress of loose coating fragments into the lubrication system of the mechanism via the relief valve, which becomes particularly important as the coating draws near its being worn down.

In the following, the invention is more fully apparent through a detailed description of the best mode to carry it into effect, with due references to the accompanying drawings.

BEST MODE OF CARRYING THE INVENTION INTO EFFECT

Figure 1:
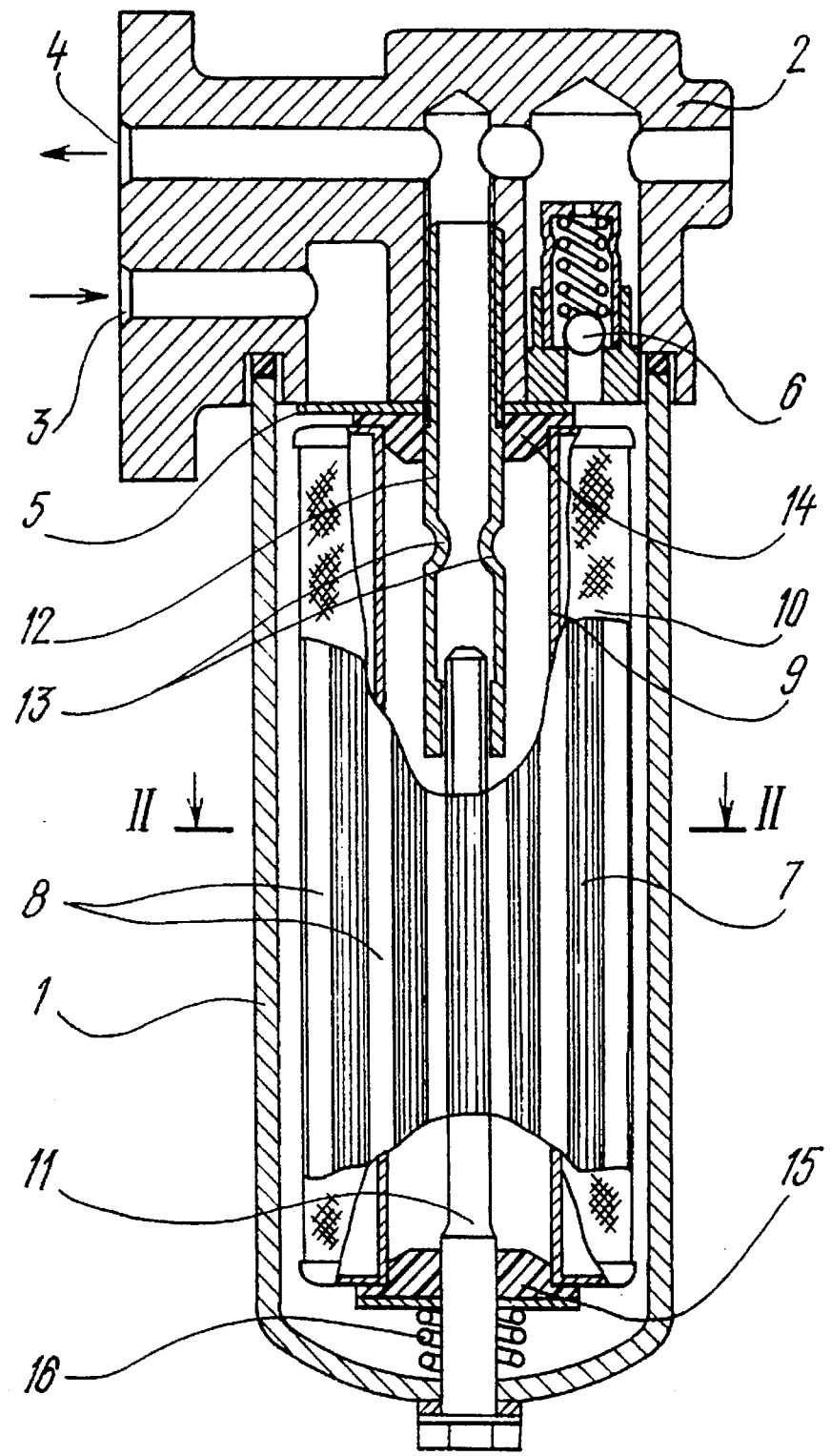
FIG. 1 is a schematic illustration of the device according to the invention, designed to provide a tribochemical mode of operation in a lubrication system for a mechanism, in longitudinal section.
Figure 2:
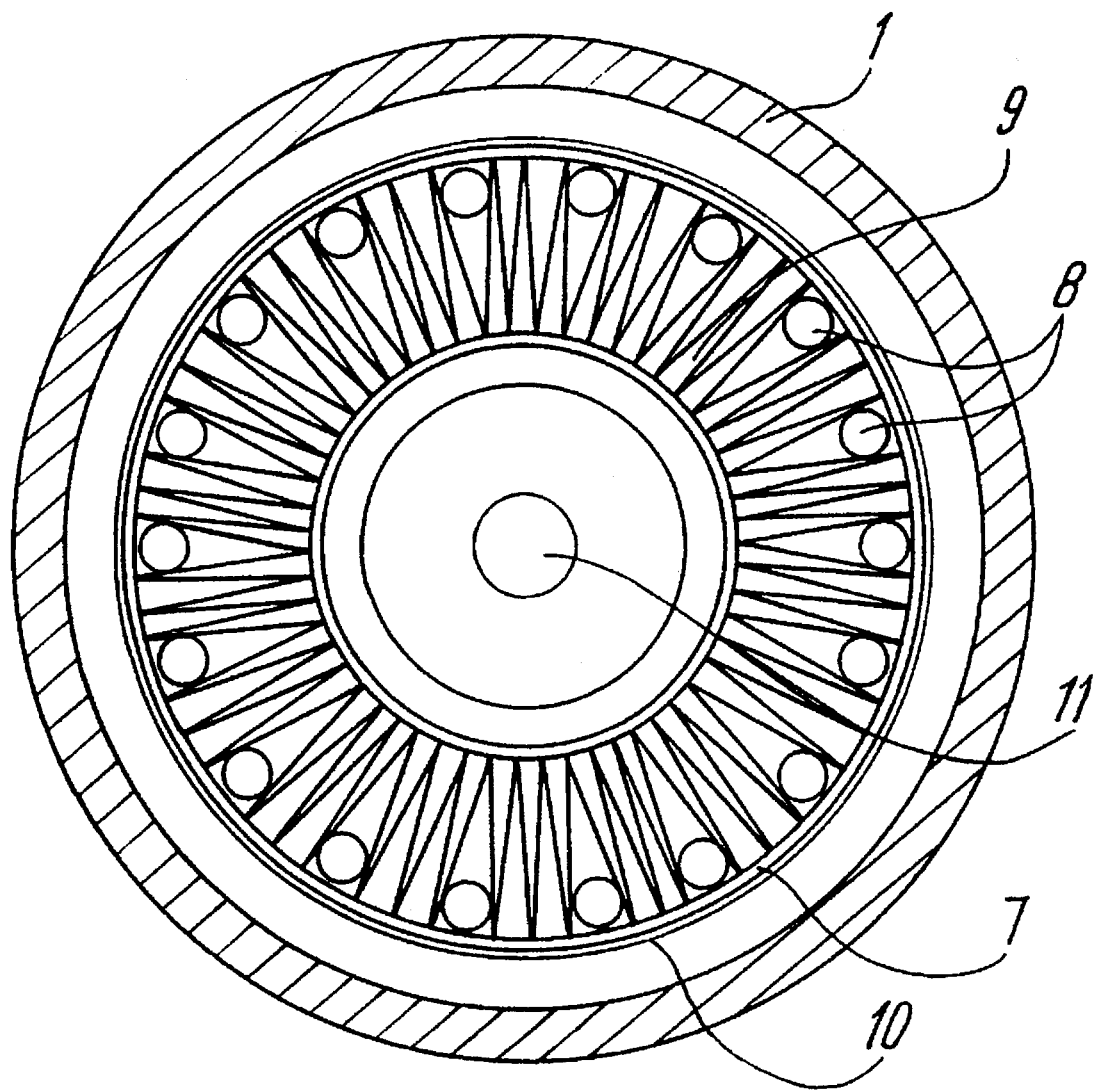
FIG. 2 is a cross-sectional view of FIG. 1.

The device to provide a tribochemical mode of operation in the lubrication system of a mechanism comprises a casing 1 (FIG. 1), a cover 2 with oil inlet and outlet holes 3 and 4, a non-return valve 5, a relief valve 6, and a full-flow oil filtering element 7. Outside the filtering element 7 (FIG. 2), installed in its corrugations are aluminium rods 8 coated with alkaline reagent. The interior part 9 (FIG. 1) of the filtering element 7 is impregnated with iodine, and a protective textile or gauze covering 10 is placed over the filtering element 7. The casing 1 and the cover 2 are joined together by means of a coupling bolt 11 screwed into a threaded sleeve 12. Fitted in the sleeve 12 are holes 13 to allow oil passage. The filtering element is retained by means of seals 14 and 15 and a spring 16.

The simplicity of design characteristic of the inventive device and ease of manufacture are achieved owing to the fact that any mass-produced full-flow oil filter may be as a base for the inventive device, with alkaline reagent-coated rods and iodine provided in and thereabout. It should be obvious for any one skilled in the art that the inventive device can be realized using the filtering element not only of the corrugated form as described here in before, but also of a smooth-surfaced type. The cover, non-return valve, and relief valve may have a design differing from that illustrated in the drawings. Joining the cover to the casing may be done without using a coupling bolt passing inside the filtering element—any other known method would suit the purpose. However, whichever might be the case, the device will operate as described hereunder.

The rods are made of an aluminium wire of 1 to 3 mm diameter. Coating the rods with an alkaline reagent, a fusion product of sodium hydroxide and tin oxide, may be done directly, by using the melt, or else by processing or any other suitable techniques. The reagent is applied in the amount of 0.1 to 0.2 g per centimeter length of each rod, and the number of rods to be selected should provide for the total amount of reagent within device to give 8 to 10 g per liter of motor oil in the lubrication system of the mechanism. The rods' height corresponds with that of the filtering element, and for fastening the rods to the filter any suitable method will do, for example using stay wires.

The provision of iodine effected by impregnating the interior of the filtering element with a solution thereof, or sublimation of iodine, or by mounting in the inner space the filtering element of a special iodine carrier. The total amount of iodine within the device should be 0.3 to 0.4 g per liter of the motor oil in the lubrication system.

The amount of alkaline reagent and iodine as stated will assure maintenance of the tribochemical mode of operation in the lubrication system for a period of time comparable with the continuous-service life of a standard filtering element. As a result, there will no longer be any need of monitoring the operation of the device, and this will facilitate its operation.

The device operates as follows.

As the engine is started up, the oil is supplied from the crankcase via the inlet hole 3 and the non-return valve 5 into the space between the casing 1 and the oil filtering element 7. Then the oil passes through the protective covering 10 to contact the alkaline reagent-coated rods 8. As the oil reacts with the alkaline reagent, the latter is partially dissolved, the oil-contained carboxylic acids are neutralized, and the acid number increases. Further on, in passing through the filtering element 7, the oil is cleaned of mechanical impurities and partially dissolves a quantity of iodine. The filtered and heated oil with dissolved additives contained therein will give rise to and maintain tribochemical conditions leading to the reduction of acidified lubricant forms and to the formation of friction modifiers. Next, the oil passes through the holes 13 of the threaded sleeve 12, the outlet hole 4 in the cover 2, and feeds into the cylinder block of the engine. Owing to the presence in the oil of friction modifiers, a metal plating film is formed on the friction-affected surfaces of cylinders and pistons. This affords compensation for wear of pairs of surfaces in friction and improvement of their corrosion resistance, as well as reduced coefficient of friction, the result being a noticeable increase in engine service life.

INDUSTRIAL APPLICABILITY

The proposed device to provide a tribochemical mode of operation can be in mechanisms with circulating systems of lubrication, having loaded pairs of surfaces in friction or combustion chambers, thus in large sized presses, compressors, or internal combustion engines. Considering the specific design features of said mechanisms, the proposed device can be used best advantage in carburetor engines. The device is a multi-purpose type, as it may be realized using any mass-produced full-flow oil filter as a base. The use of this device will not require the lubrication system of a mechanism to be modified. The device is easy to manufacture, convenient to operate, and reliable.

We claim:

1. A device to provide a tribochemical mode of operation in a lubrication system for a mechanism, comprising:

a casing, a cover for the casing, the cover having holes defined therein for allowing lubrication fluid to flow into and out of the casing, a full-flow filtering element provided within the casing, such that lubrication fluid flowing into the casing will flow through the filtering element from a first side of the filtering element to a second side of the filtering element, metal rods provided around a perimeter of the filtering element at the first side of the filtering element, an alkaline reagent coated over the metal rods, and iodine provided at the second side of the filtering element.

2. A device as defined in claim 1, wherein the rods are made of aluminum.

3. A device as defined in claim 2, wherein the rods have a height corresponding with a height of the filtering element.

4. A device as defined in claim 2, wherein a protective covering is placed over both the filtering element and the rods.

5. A device as defined in claim 1, wherein the rods have a height corresponding with a height of the filtering element.

6. A device as defined in claim 5, wherein a protective covering is placed over both the filtering element and the rods.

7. A device as defined in claim 1, wherein a protective covering is placed over both the filtering element and the rods.

8. A device as defined in claim 1, further including a non-return valve.

9. A device as defined in claim 1, further including a relief valve.

* * * * *